United States Patent
Chauvin et al.

(10) Patent No.: US 9,493,138 B2
(45) Date of Patent: Nov. 15, 2016

(54) OBTURATING ELEMENT, GAS GENERATOR PROVIDED WITH THE LATTER AND METHOD FOR MANUFACTURING SAME

(71) Applicant: AUTOLIV DEVELOPMENT AB, Vårgårda (SE)

(72) Inventors: Aurélie Chauvin, Le Faou (FR); Dominique Le Gall, Plomelin (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/648,520

(22) PCT Filed: Nov. 29, 2013

(86) PCT No.: PCT/EP2013/075165
§ 371 (c)(1),
(2) Date: May 29, 2015

(87) PCT Pub. No.: WO2014/083180
PCT Pub. Date: Jun. 5, 2014

(65) Prior Publication Data
US 2015/0298645 A1    Oct. 22, 2015

(30) Foreign Application Priority Data
Nov. 30, 2012  (FR) ..................... 12 61522

(51) Int. Cl.
*B60R 21/274*   (2011.01)
*B60R 21/268*   (2011.01)
(Continued)

(52) U.S. Cl.
CPC ............. *B60R 21/274* (2013.01); *B21D 22/20* (2013.01); *B23K 11/002* (2013.01); *B60R 21/268* (2013.01); *F17C 5/06* (2013.01)

(58) Field of Classification Search
CPC ... B60R 21/268; B60R 21/274; B21D 22/20; B21D 22/26; B21D 22/28; B23K 11/002; F17C 5/06
See application file for complete search history.

(56) References Cited

U.S. PATENT DOCUMENTS 5,076,312 A * 12/1991 Powell ................. B60R 21/268
                                                      137/68.25
5,186,592 A *  2/1993 Budenbender ....... B23K 26/206
                                                      219/121.64

(Continued)

OTHER PUBLICATIONS

International Search Report and Written Opinion for PCT/EP2013/075165 (in English), ISA/EP, Rijswijk, NL, mailed Feb. 10, 2013.

*Primary Examiner* — Laura Freedman
(74) *Attorney, Agent, or Firm* — Stephen T. Olson; Harness, Dickey & Pierce, P.L.C.

(57) ABSTRACT

A metal obturating element is capable of being resistance-welded to the outer side of an edge of a hole of a metal wall of a pressurized gas reservoir of a gas generator, including on a first side, a portion dimensioned for covering the hole and having an end intended to be inserted into the hole, and a portion for connecting the portion to the peripheral edge, having a surface tilted rearwards relatively to the end and around the portion, this surface intended to be welded to the outer side of the edge of the hole. The element is formed with a deep-drawn part. The tilted surface forms around the central portion an angle greater than or equal to 50° and less than or equal to 80° relatively to the axis. The part includes in a second side located opposite to the first side another surface tilted rearwards relatively to the end and this by at least one angle greater than or equal to 10° and less than or equal to 80° relatively to the axis.

24 Claims, 2 Drawing Sheets

(51) Int. Cl.
*F17C 5/06* (2006.01)
*B21D 22/20* (2006.01)
*B23K 11/00* (2006.01)

(56) References Cited

U.S. PATENT DOCUMENTS

| | | | | |
|---|---|---|---|---|
| 5,738,374 A * | 4/1998 | Marsaud | ............. | B60R 21/2644 280/741 |
| 6,095,559 A * | 8/2000 | Smith | ................ | B60R 21/2644 102/704 |
| 6,227,567 B1 * | 5/2001 | Ross | ....................... | B60R 21/26 280/737 |
| 6,324,987 B1 * | 12/2001 | Wier | ................... | B60R 21/2644 102/202.14 |
| 6,629,703 B2 * | 10/2003 | Horton | ................. | B60R 21/261 137/68.13 |
| 7,104,288 B2 * | 9/2006 | Fink | ..................... | B60R 21/268 141/10 |
| 7,108,281 B2 * | 9/2006 | Butler | .................. | B60R 21/272 137/519.5 |
| 7,328,914 B2 * | 2/2008 | Katsuda | ................ | B60R 21/261 280/736 |
| 7,401,808 B2 * | 7/2008 | Rossbach | ............... | B60R 21/268 137/68.27 |
| 7,461,860 B2 * | 12/2008 | Ryan | ....................... | B60R 21/00 280/737 |
| 7,866,688 B2 * | 1/2011 | Basten | ................... | B60R 21/20 280/729 |
| 8,001,903 B1 * | 8/2011 | Quintana | ................. | F42B 7/02 102/370 |
| 8,356,408 B2 * | 1/2013 | Asanuma | .............. | B60R 21/268 220/361 |
| 2005/0230948 A1 | 10/2005 | Al-Amin et al. | | |
| 2007/0257476 A1 | 11/2007 | Green et al. | | |
| 2009/0313821 A1 | 12/2009 | Asanuma et al. | | |
| 2010/0059975 A1 * | 3/2010 | Sattler | ....................... | F17C 1/14 280/741 |
| 2013/0272484 A1 * | 10/2013 | Lee | .......................... | G21C 3/10 376/451 |
| 2016/0016532 A1 * | 1/2016 | Kapfelsperger | ...... | B60R 21/264 280/737 |

\* cited by examiner

OBTURATING ELEMENT, GAS GENERATOR PROVIDED WITH THE LATTER AND METHOD FOR MANUFACTURING SAME

CROSS-REFERENCE TO RELATED APPLICATIONS

This application is a 371 U.S. National Stage of International Application No. PCT/EP2013/075165, filed Nov. 29, 2013. This application is based on and claims the benefit of priority of French Patent Application No. 1261522 filed Nov. 30, 2012. The entire disclosures of the above applications are incorporated herein by reference.

FIELD

The invention relates to an element for obturating a gas reservoir of a gas generator, to such a gas generator provided with this obturating element, as well as to a method for manufacturing the generator.

DISCUSSION

BACKGROUND

Such gas generators are intended for automobile safety.

One of the applications of such a generator is that of safety retention systems of the inflatable protective bag type, still called an "airbag".

Certain types of gas generator, for example so-called hybrid gas generators and so-called "cold gas" generators include at least one reservoir of pressurized gas, the wall of which has a hole for letting through gas for filling the reservoir with pressurized gas, the hole being obturated by a plug welded to the wall.

Such generators are known, wherein the plug for example has a ball-shaped end coming into the hole.

A first drawback of these plugs is that their resistance welding generates significant burrs which are aggressive for the operator of the production line or for the bag which has to be inflated with the gas from the generator. Thus, the burrs form protruding and cutting rough patches outside the hole, which may undesirably tear the bag during its inflation, but which may also injure the persons handling the wall of the generator.

A second drawback of these plugs is that their shape forces them to be made by cold heading, which has a high manufacturing cost. Document FR-A-2 911 291 describes such a manufacturing method, in which a compact billet from metal wire and having initially a longitudinal fiber structure parallel to a generatrix is deformed by heading until a sphere is obtained, which is then itself deformed by heading until the desired shape is obtained, in which the fiber structure is oriented randomly.

Gas generators are also known, in which the gas reservoir is closed by a component which is both used for filling the reservoir and as a nozzle or diffuser for discharging the gas towards the bag in order to inflate it.

The drawback of these generators is that the part which has to be welded for obturating the hole is more expensive to make and the hole to be obturated is of a greater diameter which makes the filling and welding operation more complex.

SUMMARY

The invention aims at obtaining an obturating element which may be welded to a gas reservoir of a gas generator, a gas generator, as well as a method for making the gas generator, which overcome the drawbacks of the state of the art.

For this purpose, a first object of the invention is a metal obturating element, able to be resistance-welded to the outer side of a first edge of a hole of a metal wall of a pressurized gas reservoir of a gas generator, the obturating element including, on a first side, from a central geometrical axis of the latter towards a second peripheral edge of the latter:

a first central portion dimensioned in order to cover the hole and having a front end intended to be at least partly inserted into the hole, a second portion for connecting the first central portion to the second peripheral edge, the second connecting portion having, on the first side, a surface tilted rearwards relatively to the front end of the first portion and around the first portion, this tilted surface being intended to be welded to the outer side of the first edge of the hole of the metal wall of the pressurized gas reservoir, in order to obturate the hole, characterized in that the obturating element is a deep-drawn part, the tilted surface of the second connecting portion in the first side is tilted around the first central portion by at least one first angle greater than or equal to 50° and less than or equal to 80° relatively to the central geometrical axis, the part including in a second side located opposite to the first side, another surface tilted rearwards relatively to the front end of the first portion and this by at least one second angle greater than or equal to 10° and less than or equal to 80° relatively to the central geometrical axis.

By means of the invention, the welding burrs of the obturating element are reduced. Because of the first angle between the wall and the tilted surface of the first side, in which the welding with the first edge of the hole is carried out, one manages to have both a lesser amount of burrs, and that the existing burrs remain substantially confined between the surface and the wall, outside the hole. The obturating element according to the invention also occupies less space above the wall. Further, because of the second angle located on the second side, the other tilted surface is available for carrying out its self-centering relatively to the axis of a resistance-welding electrode. Further, the fact that the obturating element is a deep-drawn part allows favorable orientation of the fiber structure, since in one embodiment, the deep-drawing is achieved from a metal sheet, the fiber structure of which extends along a direction substantially located in the plane of the sheet. Further, in these cases, the deep-drawing method generates very few geometrical stresses in the first central portion which gives the possibility of reducing the diameter of the filling hole to diameters of less than 2 mm. This reduction in the hole diameter gives the possibility of obtaining in this case, when the gas reserve is cylindrical with a circular base, a more planar hole surface to be obturated, which generates a more regular weld.

According to an embodiment, the obturating element does not jut out from the side of the wall, which is opposite to the one on which it is welded and which is inside the gas reservoir. This gives for example the possibility of housing another material at the hole (a pyrotechnic material for example).

According to an embodiment of the invention, the tilted surface of the second connecting portion on the first side and/or the other tilted surface on the second side is substantially conical around the central geometrical axis.

According to another embodiment of the invention, the tilted surface on the first side and/or the other tilted surface on the second side are dome-shaped.

According to another embodiment of the invention, the first angle and/or the second angle increase from the central portion to the second peripheral edge.

According to an embodiment of the invention, the second angle is greater than or equal to 50°.

According to an embodiment of the invention, the first angle and/or second angle is greater than or equal to 55°.

According to an embodiment of the invention, the first angle and/or the second angle is greater than or equal to 60°.

According to an embodiment of the invention, the first angle and/or the second angle is less than or equal to 75°.

According to an embodiment of the invention, the first angle and/or the second angle is less than or equal to 70°.

According to an embodiment of the invention, the other tilted surface of the second side delimits a recess surrounded by the second peripheral edge.

According to an embodiment of the invention, the tilted surface of the first side extends both on the second connecting portion and on the first central portion.

According to an embodiment of the invention, the other tilted surface of the second side is of a shape mating the tilted surface of the first side.

According to an embodiment of the invention, the first central portion and the second connecting portion are in one piece.

According to an embodiment of the invention, the deep-drawn part has a fiber structure oriented parallel to the tilted surface of the first side and/or to the other tilted surface of the second side.

A second object of the invention in a gas generator including at least one pressurized gas reservoir having at least one metal wall in which at least one hole is found delimited by a first edge, the first edge of the hole being obturated by an obturating element welded to the first edge of the wall, characterized in that the obturating element is as described above, the front end of the first central portion of the obturating element being inserted into the hole, the first central portion covering the hole, a surface for welding to the first edge of the hole of the metal wall of the pressurized gas reservoir being present on the first side in said tilted surface of the second portion for connecting the obturating element, the second peripheral edge of the obturating element protruding above the wall.

According to an embodiment of the invention, the wall is curved.

A third object of the invention is a method for making a gas generator as described above, characterized in that during a first step for manufacturing the obturating element, a metal part is deep-drawn in order to form said obturating element, the tilted surface of which of the second connecting portion on the first side forms around the first central portion at least the first angle greater than or equal to 50° and less than or equal to 80° relatively to the central geometrical axis and the other surface of which, on a second side located opposite to the first side, is tilted rearwards relatively to the front end of the first portion by at least one second angle greater than or equal to 10° and less than or equal to 80° relatively to the central geometrical axis, during a second step for assembling the gas generator, said tilted surface of the second connecting portion located on the first side of the obturating element, is resistance-welded to the outer side of the first edge of the hole of the metal wall of the gas reservoir, in order to obturate the hole.

According to an embodiment of the invention, during said second step for assembling the gas generator, at least the gas reservoir of the gas generator is filled with pressurized gas through the hole of the metal wall of the latter and said tilted surface of the second connecting portion, located on the first side of the obturating element is resistance-welded to the outer side of the first edge of the hole of the metal wall of the gas reservoir, in order to obturate the hole.

DESCRIPTION OF THE DRAWINGS

The invention will be better understood upon reading the description which follows, only given as a non-limiting example with reference to the appended drawings, wherein.

DETAILED DESCRIPTION

Figure 1:
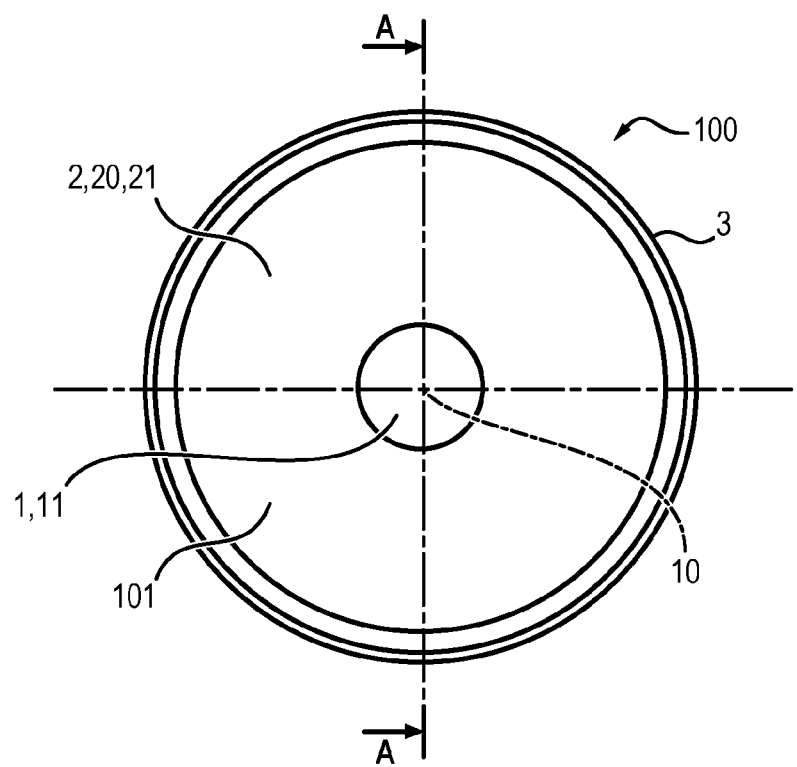
FIG. 1 schematically illustrates a bottom view of the obturating element in an embodiment according to the invention, FIG. 2 schematically illustrates a vertical sectional view of the obturating element in the embodiment of FIG. 1 according to the invention, along the sectional plane indicated by the two arrows A of FIG. 1, FIG. 3 schematically illustrates a perspective view of the obturating element in the embodiment of FIGS. 1 and 2 according to the invention, and FIG. 4 schematically illustrates a sectional view of the obturating element welded to the wall of the gas reservoir of the gas generator in an embodiment according to the invention.

In FIGS. 1 to 4 are illustrated embodiments of obturating elements 100 according to the invention. The obturating element 100 according to the invention is also called a plug.

The metal obturating element 100 is able to be welded to the outer side EXT of a edge B (called "first" edge) of a hole T of a metal wall P of a pressurized gas reservoir R of a gas generator G. The metal or metal alloy of the element 100 and the metal or metal alloy of the wall P may be different or identical. For example the element 100 and/or the wall P are in steel.

The obturating element 100 includes, on a first side 101, a first central portion 1 having a front end 11 intended to be inserted at least partly into the hole T or to be positioned facing the hole T, as well as a second portion 2 for connecting the first central portion 1 to a peripheral edge 3 (called "second" edge) of the element 100. The first side 101, which is also called the lower side, is a side turned towards the hole T and towards the outer side EXT of the edge B of the hole T. The first central portion 1 is dimensioned in order to cover the hole T. The first central portion 1 and the second connecting portion 2 extend between a central geometrical (non-material) axis 10 of the element 100 and the second peripheral edge 3 of the latter. The central geometrical axis 10 crosses the central portion 1.

In the embodiments illustrated in the figures, the central geometrical axis 10 is an axisymmetrical geometrical axis of the element 100, the central portion 1 and the connecting portion 2 (and therefore its surface 20 described below) being axisymmetrical around this axis 10. Of course, before and/or after welding, the central portion 1 and/or the connecting portion 2 may no longer be axisymmetrical.

The second connecting portion 2 has on the first side 101 a surface 20 tilted rearwards relatively to the front end 11 of the first central portion 1 (or a surface 20 tilted upwards relatively to the lower end 11 of the central portion 1, the central geometrical axis 10 being directed from bottom to top, as indicated by the arrow 12). The second connecting portion 2 and/or the tilted surface 20 is positioned around the first portion 1 radially relatively to the geometrical axis 10. This tilted surface 20 is intended to be welded to the outer side EXT of the first edge B of the hole T of the metal wall P of the pressurized gas reservoir R. The direction from the front to the rear is meant along the central geometrical axis 10 in the direction of the arrow 12, while being directed from the inside of the reservoir R to the outside of the reservoir R. In an embodiment, the central geometrical axis 10 is for example perpendicular to a plane in which may be found the contour of the upper end of the edge 3, the most distant from the lower end 11 of the central portion 1.

According to the invention, the tilted surface 20 of the second connecting portion 2 in the first side 101 forms around the first central portion 1 at least one first angle ANG greater than or equal to 50° and less than or equal to 80° relatively to the central geometrical axis 10. The obturating element 100 is formed with a deep-drawn part.

Therefore, it is in this tilted surface 20 that is provided the surface 21 for welding the element 100 to the outer side EXT of the edge B of the hole T of the wall P of the gas reservoir R, this surface 21 for welding the connecting portion 2 may be deformed relatively to the tilted surface 20 because of the rise in temperature during the welding operation. The tilted surface 20 and/or the welding surface 21 occupy a closed contour around the central portion 1 and/or around the central geometrical axis 10. The surface 20 is the one before welding. The surface 21 is the one after welding.

In an embodiment, the first angle ANG is greater than or equal to 55°, while being able to be greater than or equal to 60° for example.

In an embodiment, the first angle ANG is less than or equal to 75°, while being able to be lower than or equal to 70° for example.

In an embodiment, the first angle ANG is greater than or equal to 60° and less than or equal to 70°.

Figure 2:
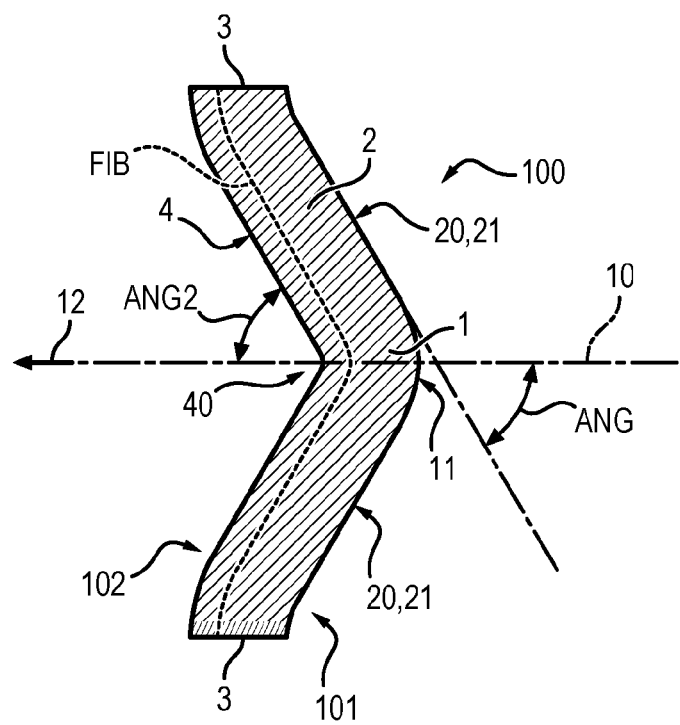
Figure 3:
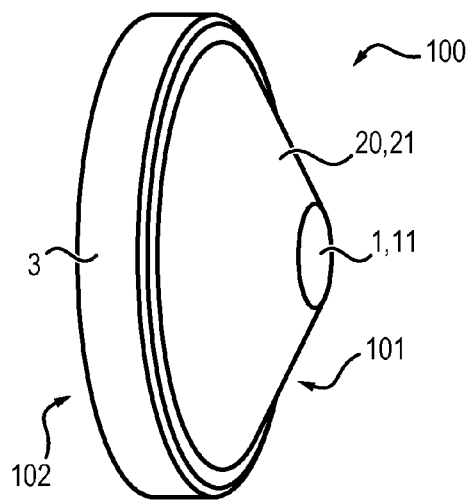

For example, in FIGS. 1 to 3, the first angle ANG is 60°.

In the embodiment illustrated in FIGS. 1 to 3, the tilted surface 20 is conical around the central geometrical axis 10.

In another embodiment not shown, the first angle ANG of the tilted surface 20 decreases from the central portion 1 to the second peripheral edge 3.

In another embodiment not shown, the tilted surface 20 is dome-shaped.

In another embodiment not shown, the first angle ANG of the tilted surface 20 increases from the central portion 1 to the second peripheral edge 3.

In the embodiments illustrated in the figures, on a second side 102 located opposite the first side 101, the obturating element 100 includes another surface 4 tilted rearwards relatively to the front end 11 of the first portion. This other surface 4 is tilted by at least one second angle ANG2 greater than or equal to 10° and less than or equal to 80° relatively to the central geometrical axis 10.

In an embodiment, this other surface 4 delimits a recess 40 surrounded by the second peripheral edge 3.

In an embodiment, the second angle ANG2 is greater than or equal to 50 or 55°, while being able to be greater than or equal to 60° for example.

In an embodiment, the second angle ANG2 is less than or equal to 75°, while being able to be less than or equal to 70° for example.

In an embodiment, the second angle ANG2 is greater than or equal to 60° and less than or equal to 70°.

For example, in FIGS. 1 to 3, the second angle ANG2 is 60°.

In the embodiment illustrated in FIGS. 1 to 3, the other tilted surface 4 is conical around the central geometrical axis 10.

In another embodiment not shown, the second angle ANG2 of the other tilted surface 4 decreases from the central portion 1 to the second peripheral edge 3.

In another embodiment not shown, the other tilted surface 4 is dome-shaped.

In another embodiment not shown, the second angle ANG2 of the other tilted surface 4 increases from the central portion 1 to the second peripheral edge 3.

In another embodiment not shown, the other tilted surface 4 may be a conical portion or a spherical portion.

In an embodiment illustrated in FIGS. 1 to 4, the tilted surface 20 of the first side 101 extends both on the second connecting portion 2 and on the first central portion 1.

For example, this other opposite surface 4 has a shape which mates that of the tilted surface 20. For this purpose, the element 100 and the tilted surfaces 4 and 20 and therefore the angles ANG and ANG2 are made by deep-drawing.

In the embodiments illustrated in the figures, the central portion 1 and the connecting portion 2 are in one piece, by the fact that the element 100 is made by deep-drawing a same metal for example discoidal part.

Figure 4:
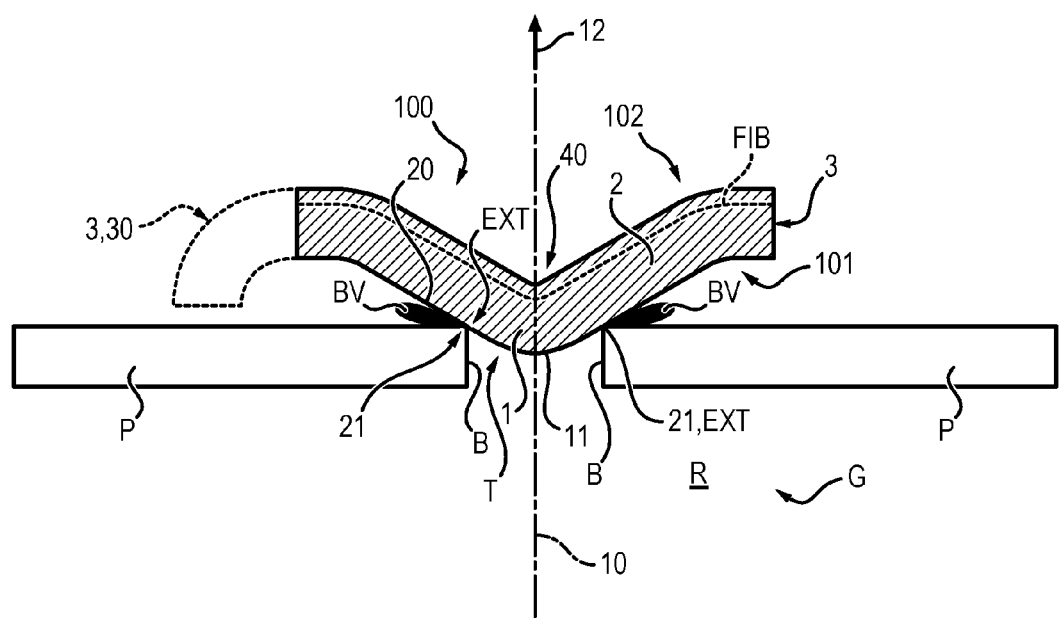

FIG. 4 illustrates an embodiment of a gas generator according to the invention, which includes at least the pressurized gas reservoir R having at least the metal wall P in which is found at least the hole T delimited by the first edge B, this hole T being obturated by the obturating element 100 according to the invention, having been welded to this first edge of the wall P. The front end 11 of the first central portion 1 of the obturating element 100 is inserted into the hole T. The first central portion 1 of the element 100 faces the hole T and covers the hole T. The surface 21 for welding the obturating element 100 to the first edge B of the hole of the metal wall P is present in the tilted surface 20 of the second connecting portion 2 on the first side 101. The second peripheral edge 3 of the obturating element 100 protrudes above the wall P on the outside of the reservoir R. In the embodiment illustrated in FIG. 4, the element 100 is welded onto the outer side EXT of the edge B.

In an embodiment, the hole T of the wall P is used as a hole for letting through gas for filling the reservoir R with pressurized gas.

The invention also provides a method for manufacturing a gas generator including the following steps.

During a first step for making the obturating element 100, a metal part is deep-drawn in order to form said obturating element 100, so that the tilted surface 20 of the second connecting portion 2 located on the first side 101 forms, around the first central portion 1, at least the first angle ANG greater than or equal to 50° and less than or equal to 80° relatively to the central geometrical axis 10 and so that on the second side 102 located opposite to the first side 101, the other surface 4 is tilted rearwards relatively to the end 11 of the first portion 1, by at least the second angle ANG2 greater than or equal to 10° and less than or equal to 80° relatively to the central geometrical axis 10. In an embodiment, this deep-drawing is carried out by shaping the metal part, for example from steel plate, this deep-drawn part then being cut out.

In deep-drawing, it is possible to have a lower cost of the element 100 than in heading, with reduced tooling. Further, deep-drawing gives the possibility of having the angle ANG vary more easily, while heading does not give the possibility of having an angle ANG beyond 45°. In an embodiment, deep-drawing is achieved in a metal sheet, formed with wires extending in a same fiber structure direction located in the plane of the sheet. The sheet for example stems from a coil of metal sheet or strip. With deep-drawing, it is possible to guarantee that the fiber structure FIB of the element 100 will be parallel to the surface 20 and/or to the other surface 4, as this is illustrated by the dashed line in FIGS. 2 and 4. The risks of gas leakage through the elements 100 are thereby reduced.

Next, during a second step for assembling the gas generator G, said tilted surface 20 of the second connecting portion 2 of the obturating element 100 is resistance-welded to the outer side EXT of the first edge B of the hole T of the metal wall P of the gas reservoir R. The hole T is thereby obturated with the element 100.

This welding operation during the second step deforms all or part of the tilted surface 20 of the portion 2 of the element 100, in order to form from this tilted surface 20 of the portion 2 of the element 100, the welding surface 21 of the portion 2 of the element 100 to the outer side EXT of the edge B of the hole T. Therefore, because of this deformation, this welding surface 21 of the portion 2 of the element 100 may form an angle different from the initial angle ANG of the tilted surface 20.

An embodiment of this welding operation is described below during the second step.

The welding operation is carried out with resistance welding, during which an electrically conducting mandrel (or electrode) bears upon the opposite surface 4 of the obturating element 100 in order to apply it against the outer side EXT of the edge B of the hole T, so that the element 100 touches this outer side EXT of the edge B of the hole T through a contact area located in the tilted surface 20 of its portion 2. The mandrel is located outside the gas reservoir R. At the welding station, by applying an electric voltage with an electric voltage source between this mandrel and a counter-electrode for electric connection to the wall P delimiting the hole T, an electric current is passed between the obturating element 100 and the edge B of the hole T. This electric current heats by the Joule effect the contact area between the tilted surface 20 of the obturating element 100 and the outer side EXT of the edge B of the hole T to a sufficient temperature in order to melt the metal material located in this contact area, i.e. partly the metal material of the outer side EXT of the edge B of the hole T and partly the metal material of the tilted surface 20 which are thereby attached to each other. The molten material of the tilted surface 20 thus forms the welding surface 21 of the obturating element 100. The mandrel then slightly drives the element 100 into the edge B of the hole T from the outside. The welding surface 21 therefore surrounds the whole of the edge B of the hole T.

According to an embodiment, the other tilted surface 4 of the obturating element 100 has a function for self-centering the obturating element on the mandrel, for example by the shape of the recess 40 which it delimits. This surface 4 is for example axisymmetrical while being tilted around the geometrical central axis 10, and is for example conical. Thus, it is sufficient to properly position relatively to the hole T, the mandrel with the shape mating that of the surface 4, in order to properly position the element 100 relatively to the hole T, the surface 4 of the element 100 ensuring self-centering of the latter relatively to the hole T. The passing of the current is optimized, since the contact area between the obturating element 100 and the hole is always the same, which gives the possibility of having a homogeneous weld. This proper positioning of the element 100 also avoids undesirably crushing a portion of the latter, which may happen with obturating elements from the state of the art including in the central portion a nipple which may be crushed by the welding in the case of poor positioning.

The welding of the obturating element 100 to the outer side EXT of the hole T generates burrs BV towards the outside of the wall P. Because of the tilted surface 20 according to the invention, these burrs BV jut out slightly from the latter and therefore generate few protruding bumps outwards, which reduces the risks of both injury to persons and accidental catching on other objects, in particular being able to puncture the bag inflated by the generator. This may be particularly of interest in the case of welding on a non-planar hole T, such as for example on a hole T of a curved wall P, as this is often the case for the walls P which may be tubular or cylindrical, of gas reservoirs provided in the gas generators, since in these cases the welding generates irregular burrs BV around the hole T.

According to an embodiment, during the second step for assembling the gas generator G, at least the gas reservoir R of the gas generator G is filled with pressurized gas through the hole T of the metal wall P, which is obturated by carrying out the welding of the element 100 to the outer side EXT of the first edge B of the hole T as described above. The reservoir R is then hermetically filled with pressurized gas for its storage. This filling is carried out for example by performing welding of the element 100 in a gas atmosphere having the desired pressure.

In an embodiment, the generator G includes an opening system not shown, which may use one or several electrical pyrotechnic initiators and/or a pyrotechnic charge and/or a mechanical system, which allows, by sending an electric signal to electric contacts of the system, the opening of a wall or lid initially closing the reservoir R, so that the pressurized gas stored in the reservoir R may escape outwards, for example for inflating an initially folded bag of the safety airbag type.

In an embodiment, the second peripheral edge 3 is formed by an edge 30 curved in the opposite direction of the tilted surface 20, as this is illustrated by the dashed lines on the left of FIG. 4. In this case, the edge 30 is therefore curved towards the wall P at a distance from the hole T when the element 100 has been welded to the hole T.

In another embodiment, the second peripheral edge 3 is a surface located rearwards relatively to the tilted surface 20, as this is illustrated by the solid lines on the right of FIG. 4 and in FIGS. 1 to 3. In these cases, the peripheral edge 3 is directly formed at the edge 3 of the tilted surface 20 and of the portion 2. In these cases, the second peripheral edge 3 is without any edge 30 curved in the opposite direction of the tilted surface. Therefore, it is not indispensable to provide the element 100 with an outer edge 30 curved towards the wall P.

In another embodiment, the second edge 3 may also be formed by a flat ring extending the portion 2.

The invention claimed is:

1. A metal obturating element capable of being resistance-welded to the outer side of a first peripheral edge of a hole of a metal wall of a pressurized gas reservoir of a gas generator, the obturating element comprising:

on a first side, from a central geometrical axis of the element towards a second peripheral edge of the element:

a first central portion dimensioned in order to cover the hole and having a front end intended to be at least partly inserted into the hole, a second portion for connecting the first central portion to the second peripheral edge, the second connecting portion, having on the first side, a surface tilted rearwards relatively to the front end of the first central portion and around the first central portion, this tilted surface being welded directly to the outer side of the first edge of the hole of the metal wall of the pressurized gas reservoir, in order to obturate the hole, wherein the metal obturating element is a deep-drawn part formed of a metal sheet, wherein the tilted surface of the second connecting portion in the first side is tilted around the first central portion by at least one first angle greater than or equal to 50° and less than or equal to 80° relatively to the central geometrical axis, wherein the metal obturating element includes a second side located opposite to the first side, another tilted surface tilted rearwards relatively to the front end of the first central portion and at least one second angle greater than or equal to 10° and less than or equal to 80° relatively to the central geometrical axis.

2. The metal obturating element according to claim 1, wherein at least one of the tilted surface of the second connecting portion on the first side and the other tilted surface on the second side is substantially conical around the central geometrical axis.

3. The metal obturating element according to claim 1, wherein at least one of the tilted surface on the first side and the other tilted surface on the second side is dome-shaped.

4. The metal obturating element according to claim 1, wherein at least one of the first angle and the at least one second angle increases from the first central portion towards the second peripheral edge.

5. The metal obturating element according to claim 1, wherein at least one of the first angle and the second angle is greater than or equal to 55°.

6. The metal obturating element according to claim 1, wherein at least one of the first angle and the second angle is greater than or equal to 60°.

7. The metal obturating element according to claim 1, wherein at least one of the first angle and the second angle is less than or equal to 75°.

8. The metal obturating element according to claim 1, wherein at least one of the first angle and the second angle is less than or equal to 70°.

9. The metal obturating element according to claim 1, wherein the other tilted surface of the second side delimits a recess surrounded by the second peripheral edge.

10. The metal obturating element according to claim 1, wherein the tilted surface of the first side extends both on the second connecting portion and on the first central portion.

11. The metal obturating element according to claim 1, wherein the other tilted surface of the second side is of a shape mating the tilted surface of the first side.

12. The metal obturating element according to claim 1, wherein the first central portion and the second connecting portion are in one piece.

13. The metal obturating element according to claim 1 in combination with a gas generator, the gas generator including at least one pressurized gas reservoir having at least one metal wall in which is found at least one hole delimited by a first edge, the first edge of the hole being obturated by an obturating element welded to the first edge of the wall, wherein the front end of the first central portion of the obturating element is inserted into the hole, the first central portion covering the hole, a surface for welding to the first edge of the hole of the metal wall of the pressurized gas reservoir being present on the first side in said tilted surface of the second connecting portion of the obturating element, and the second peripheral edge of the obturating element protruding above the wall.

14. The gas generator according to claim 13, wherein the wall is curved.

15. A method for manufacturing a gas generator according to claim 13, the method comprising:

during a first step for manufacturing the obturating element, a metal part is deep-drawn in order to form said obturating element, the tilted surface of which of the second connecting portion on the first side forms the first angle greater than or equal to 50° and less than or equal to 80° relatively to the central geometrical axis and the other surface of which, on a second side located opposite to the first side, is tilted rearwards relatively to the front end of the first portion by at least one second angle greater than or equal to 10° and less than or equal to 80° relatively to the central geometrical axis, and during a second step for assembling the gas generator, said tilted surface of the second connecting portion located on the first side of the obturating element is resistance-welded to an the outer side of the first edge of the hole of the metal wall of the gas reservoir, in order to obturate the hole.

16. The manufacturing method according to claim 15, wherein during said second step for assembling the gas generator, at least the gas reservoir of the gas generator is filled with pressurized gas through the hole of the metal wall of the gas reservoir and said tilted surface of the second connecting portion located on the first side of the obturating element is resistance-welded to the outer side of the first edge of the hole of the metal wall of the gas reservoir, in order to obturate the hole.

17. The metal obturating element according to claim 1, wherein the metal obturating element is discoidal.

18. The metal obturating element according to claim 1, wherein the first and second sides are substantially parallel.

19. A metal obturating element capable of being resistance-welded to an outer side of a first edge of a hold of a metal wall of a pressurized gas reservoir of a gas generator, the metal obturating element comprising:

on a first side, from a central geometrical axis of the element towards a second peripheral edge of the element:

a first central portion dimensioned in order to cover the hole and having a front end intended to be at least partly inserted into the hole, a second portion for connecting the first central portion to the second peripheral edge, the second connecting portion, having on the first side, a surface tilted rearwards relatively to the front end of the first central portion and around the first central portion, this tilted surface being intended to be welded to the outer side of the first edge of the hole of the metal wall of the pressurized gas reservoir, in order to obturate the hole, wherein the tilted surface of the second connecting portion in the first side is tilted around the first central portion by at least one first angle greater than or equal to 50° and less than or equal to 80° relatively to the central geometrical axis, wherein the metal obturating element includes a second side located opposite to the first side, another tilted surface tilted rearwards relatively to the front end of the first central portion and this by at least one second angle greater than or equal to 10° and less than or equal to 80° relatively to the central geometrical axis, wherein the metal obturating element has a fiber structure oriented parallel to at least one of the tilted surface of the first side and the other tilted surface of the second side.

20. A gas generator comprising:

a pressurized gas reservoir having a metal wall with a hole; and a metal obturating element resistance welded to an edge of the hole to close the hole, the metal obturating element including first and second sides extending from a central geometrical axis to a peripheral edge, a central portion having a front end and a first tilted surface between the central portion and the peripheral edge, the front end at least partially extending into the hole, the first tilted surface rearwardly tilting relative to the front end and around the central portion and welded directly to an outer side of an edge of the hole to obturate the hole, wherein the metal obturating element is discoidal.

21. The gas generator of claim 20, wherein the second side includes a second tilted surface tilted rearwards relatively to the front end of the central portion, and wherein the metal obturating element is discoidal and the first and second sides are substantially parallel to one another.

22. The gas generator according to claim 21, wherein the second tilted surface is tilted rearwards relatively to the central geometrical axis.

23. The gas generator according to claim 20, wherein the tilted surface is tilted around the first central portion by at least one first angle greater than or equal to 50° and less than or equal to 80° relatively to the central geometrical axis.

24. The gas generator according to claim 20, wherein the metal obturating element is formed from a metal sheet.

* * * * *